(12) United States Patent
Hou et al.

(10) Patent No.: US 7,173,818 B2
(45) Date of Patent: Feb. 6, 2007

(54) COUPLING STRUCTURE FOR A HANDHELD ELECTRONIC DEVICE AND A BACK CARTRIDGE THEREOF

(75) Inventors: Chuan-Kung Hou, Taipei County (TW); Cheng-Hua Hsu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 184 days.

(21) Appl. No.: 11/049,437

(22) Filed: Feb. 2, 2005

(65) Prior Publication Data
US 2006/0092602 A1 May 4, 2006

(30) Foreign Application Priority Data
Oct. 29, 2004 (TW) ............................... 93217381 U

(51) Int. Cl.
*G06F 1/16* (2006.01)
*H05K 5/00* (2006.01)

(52) U.S. Cl. ....................... 361/686; 710/303

(58) Field of Classification Search ................ 361/686, 361/679; 710/303, 304
See application file for complete search history.

(56) References Cited

U.S. PATENT DOCUMENTS

| | | | | |
|---|---|---|---|---|
| 4,969,830 A * | 11/1990 | Daly et al. | .................. | 439/136 |
| 5,859,628 A * | 1/1999 | Ross et al. | .................. | 345/173 |
| 6,028,767 A * | 2/2000 | Lan | .............................. | 361/686 |
| 6,034,869 A * | 3/2000 | Lin | .............................. | 361/686 |
| 6,093,039 A * | 7/2000 | Lord | ............................ | 439/155 |
| 6,115,246 A * | 9/2000 | Ohnishi | ....................... | 361/686 |
| 6,118,663 A * | 9/2000 | Fan | .............................. | 361/725 |
| 6,119,184 A * | 9/2000 | Takahama | .................... | 710/303 |
| 6,239,969 B1 * | 5/2001 | Howell et al. | .............. | 361/686 |
| 6,424,524 B2 * | 7/2002 | Bovio et al. | ................. | 361/686 |
| 6,570,758 B1 * | 5/2003 | Maeda | ......................... | 361/686 |
| 6,674,637 B2 * | 1/2004 | Shin et al. | .................... | 361/683 |
| 6,741,462 B2 * | 5/2004 | Kamphuis et al. | ........... | 361/686 |
| 7,085,132 B2 * | 8/2006 | Schlesener et al. | .......... | 361/686 |

* cited by examiner

*Primary Examiner*—Lisa Lea-Edmonds
(74) *Attorney, Agent, or Firm*—Thomas, Kayden, Horstemeyer & Risley

(57) ABSTRACT

A coupling structure for a handheld electronic device and a back cartridge thereof includes a first coupling assembly and a second coupling assembly. The first coupling assembly is located on the handheld electronic device. The second coupling assembly is located on the back cartridge corresponding to the first coupling assembly, and has a coupled position and a stored position. At the coupled position the second coupling assembly is extended outside the back cartridge to couple with the first coupling assembly, to thereby enable the handheld electronic device to couple with the back cartridge. At the stored position, the second coupling assembly is held in the back cartridge to allow the handheld electronic device to be separated from the back cartridge. Hence, the handheld electronic device and the back cartridge can maintain an integrated and self-contained profile.

12 Claims, 5 Drawing Sheets

COUPLING STRUCTURE FOR A HANDHELD ELECTRONIC DEVICE AND A BACK CARTRIDGE THEREOF

FIELD OF THE INVENTION

The invention relates to a coupling structure for coupling a handheld electronic device and a back cartridge thereof, and particularly to a coupling structure that enables the handheld electronic device and the back cartridge to have an integrated and self-contained profile upon separation.

BACKGROUND OF THE INVENTION

With the Internet becoming widely used these days, information related products have become vary fashionable in the market place. After having evolved over many years, the compact electronic notebook that has helped people to manage their daily tasks and business records has been gradually replaced by handheld electronic devices. These handheld electronic devices have become the personal secretaries of hi-tech professionals and business people.

The handheld electronic device is a palm size computer used as a personal digital assistant. Its functions have been enhanced and expanded from the original basic functions of calendar, to-do list, notebook, and communication directory to synchronous data transmission with computers. Some even have software installed to provide diversified applications such as online Email receiving and transmission, stock information quotation and browsing, income and payment recording, electronic book functions, computer games, spread sheet functions, database applications, household and community information, wireless communication, and the like. When used properly, they provide even greater value to users than the general personal assistants.

In order to provide enough electric power to the handheld electronic device, the present approach generally adopts a back cartridge to hold a backup battery or other functional expansion features (such as CF and SD card socket modules, a hard disk, digital camera, wireless communication module or the like).

To couple the back cartridge with the handheld electronic device, one approach being adopted at present includes a first connector located on the handheld electronic device that faces upwards, a back cartridge with a second connector facing downwards and a hook extending at 90 degrees. The first connector and the second connector are coupled together.

Another design is to form a trough on the backside of the handheld electronic device that has an exposed first connector. The back cartridge has a claw on its front side corresponding to the trough, and a second connector corresponding to the first connector. The claw may be latched in the trough to couple the first connector with the second connector.

In both designs set forth above when the handheld electronic device and the back cartridge are separated, the existing connectors, or the claws and troughs make the handheld electronic device and the back cartridge difficult to be carried and easy to be damaged.

SUMMARY OF THE INVENTION

In view of the aforesaid problems, the primary object of the invention is to provide a coupling structure for a handheld electronic device and its back cartridge that can couple the handheld electronic device and the back cartridge together, and enable the handheld electronic device and the back cartridge to maintain an integrated and self-contained profile when separated.

In order to achieve the foregoing object, the coupling structure according to the invention includes a first coupling assembly and a second coupling assembly. The first coupling assembly is located on the handheld electronic device and has a first opening and a first trough. The first opening corresponds to a first connector of the handheld electronic device. The second coupling assembly is located on the back cartridge corresponding to the first coupling assembly, and has a second opening, a second trough, a housing trough and a claw. The second opening corresponds to the first opening and the housing trough. The second trough corresponds to the first trough. The housing trough houses a second connector of the back cartridge. The second connector in the back cartridge forms an electric connection with an expansion device. The claw corresponds to the second trough. The housing trough and the claw have a coupled position and a stored position. At the coupled position, the housing trough and the claw extend respectively through the second opening and the second trough to allow the claw to clamp the first trough. The second connector in the housing trough is electrically connected to the first connector of the handheld electronic device, and the handheld electronic device is coupled to the back cartridge. At the stored position, the housing trough and the claw are held respectively in the second opening and the second trough, the second opening and the second trough are closed, and the handheld electronic device and the back cartridge may be separated.

Hence the invention can position the housing trough and the claw at the stored position and the coupled position. At the coupled position, the claw clamps the first trough of the handheld electronic device to couple the handheld electronic device with the back cartridge. At the stored position, the separated handheld electronic device and the back cartridge each form an integrated and self-contained profile.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
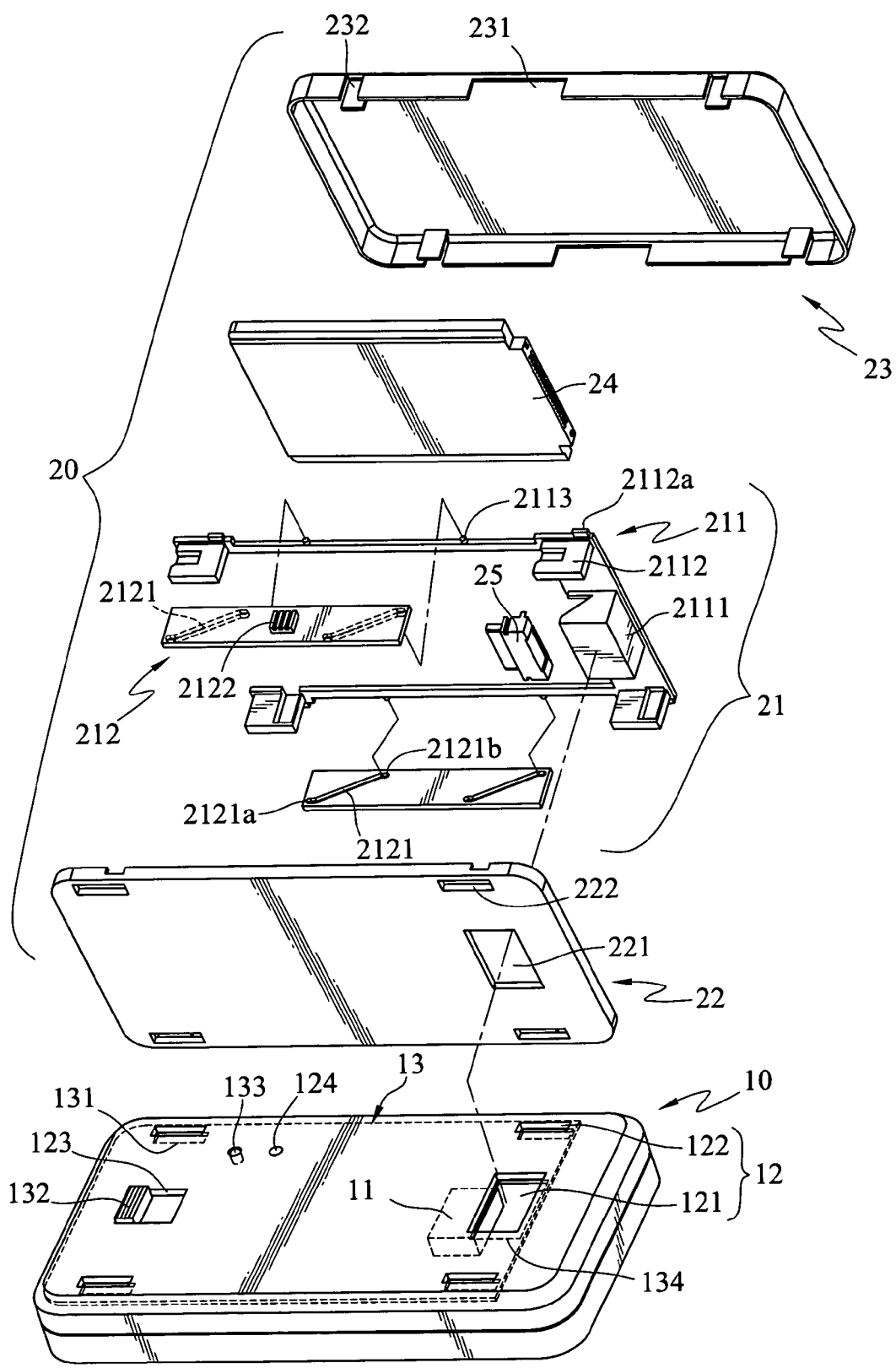
FIG. 1 is an exploded view of a first embodiment of the invention.

Refer to FIG. 1 for a first embodiment of the invention. The coupling structure according to the invention aims to couple a handheld electronic device 10 with a back cartridge 20, and enable the handheld electronic device 10 and the back cartridge 20 to maintain an integrated and self-contained profile when separated.

The coupling structure according to the invention includes a first coupling assembly 12 and a second coupling assembly 21 that are located respectively on the handheld electronic device 10 and the back cartridge 20. The following discussion is based on the electronic device 10 and the back cartridge 20. The elements involved are described in order.

The handheld electronic device 10 includes a first connector 11, a first coupling assembly 12 and a board 13. The first coupling assembly 12, which is located on the handheld electronic device 10, has a first opening 121, a first trough 122, a first hole 123 and a first anchor member 124. The first opening 121 corresponds to the first connector 11 located in the handheld electronic device 10. The first anchor member 124 is a cavity. The board 13 is movably mounted onto the handheld electronic device 10 and has a second hole 131, an exertion section 132, a second anchor member 133 and a third hole 134. The second hole 131 corresponds to the first trough 122. The exertion section 132 corresponds to the first hole 123. The second anchor member 133 corresponds to the first anchor member 124 and is a bulged spot. The third hole 134 corresponds to the first opening 121. The board 13 is movable and may be anchored by coupling the second anchor member 133 with the first anchor member 124 to close the first trough 122 and the first opening 121.

The back cartridge 20 includes the second coupling assembly 21, an upper case 22, a lower case 23, an expansion device 24 and a second connector 25. The second coupling assembly 21 corresponds to the first coupling assembly 12 and has a clipping section 211, a push section 212, a second opening 221 and a second trough 222.

Figure 2A:
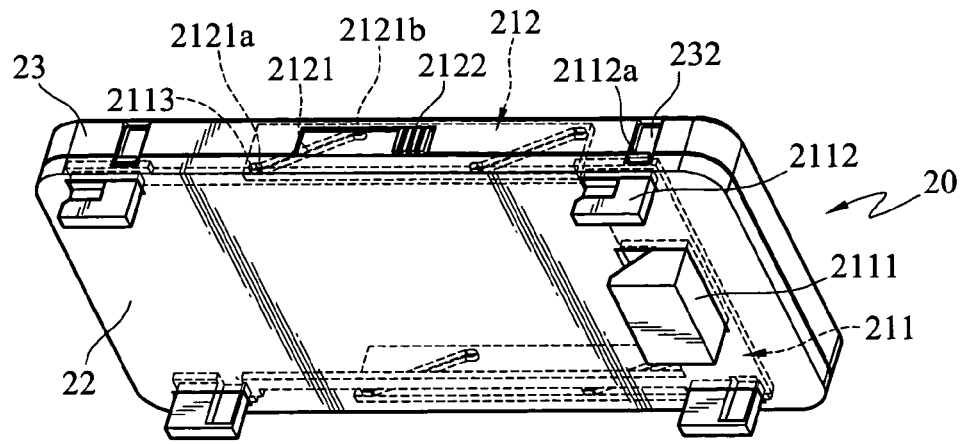
FIGS. 2A, 2B and 2C are schematic views of the first embodiment with the housing trough and the claw switching from the coupled position to the stored position.
Figure 2B:
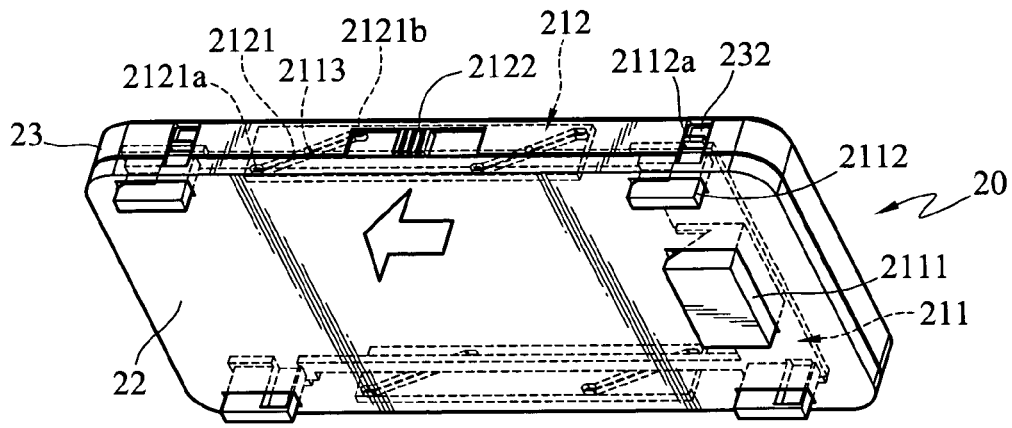
Figure 2C:
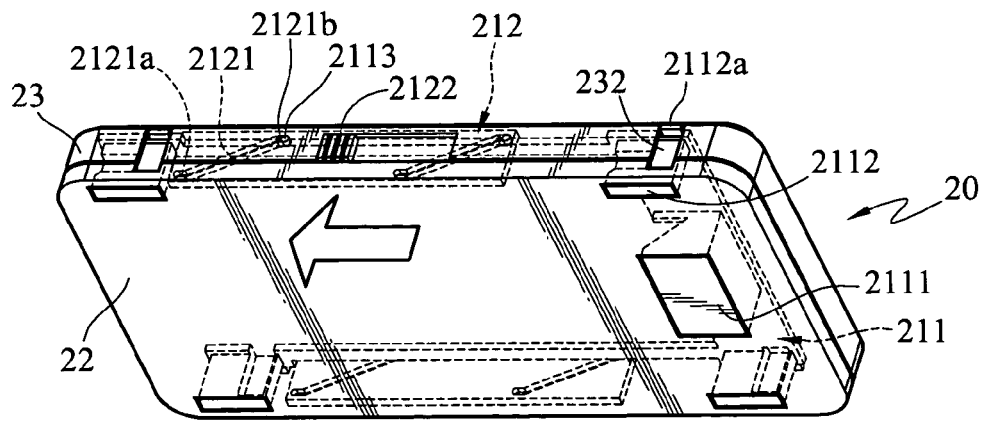

The clipping section 211 includes a housing trough 2111, a claw 2112 and a guided strut 2113. The housing trough 2111 and the claw 2112 have a coupled position and a stored position. Refer to FIGS. 2A, 2B and 2C for schematic views of the first embodiment with the housing trough and the claw switching from the coupled position to the stored position. The claw 2112 has an exertion end 2112a to receive an external force.

The push section 212 includes a guiding flute 2121 corresponding to the guided strut 2113 and anti-slipping traces 2122. The guiding flute 2121 has two ends forming a coupled end 2121a and a stored end 2121b corresponding respectively to the coupled position and the stored position. The anti-slipping traces 2122 aim to provide friction resistance when force is applied.

The second opening 221 and the second trough 222 are formed on the upper case 22. The second opening 221 corresponds to the first opening 121 and the housing trough 2111. The second trough 222 corresponds to the first trough 122 and the claw 2112. The upper case 22 and the lower case 23 mate with each other. The lower case 23 has a first notch 231 and a second notch 232. The first notch 231 corresponds to the push section 212. The second notch 232 corresponds to the exertion section 2112a of the claw 2112.

The expansion device 24 is located in the back cartridge 20. The second connector 25 is also located in the back cartridge 20 and corresponds to the housing trough 2111 to connect electrically with the expansion device 24.

Figure 3A:
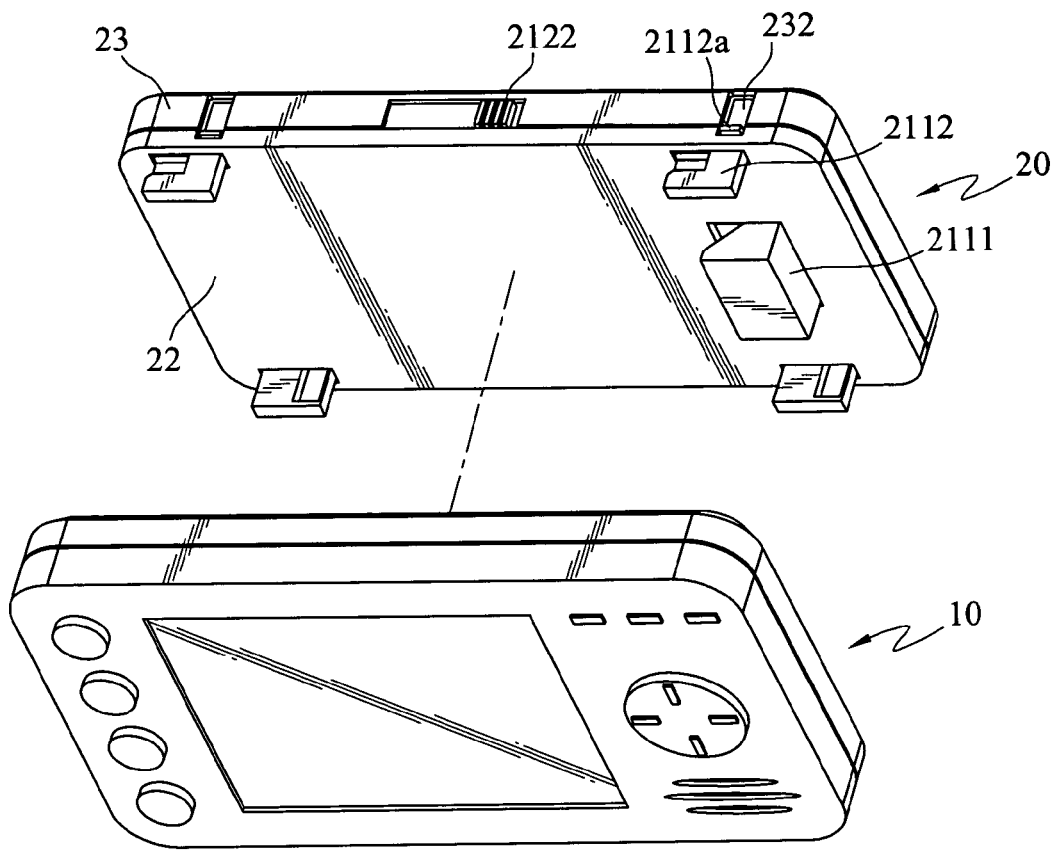
FIGS. 3A and 3B are schematic views of the first embodiment with the handheld electronic device and the back cartridge in coupled and separated conditions.
Figure 3B:
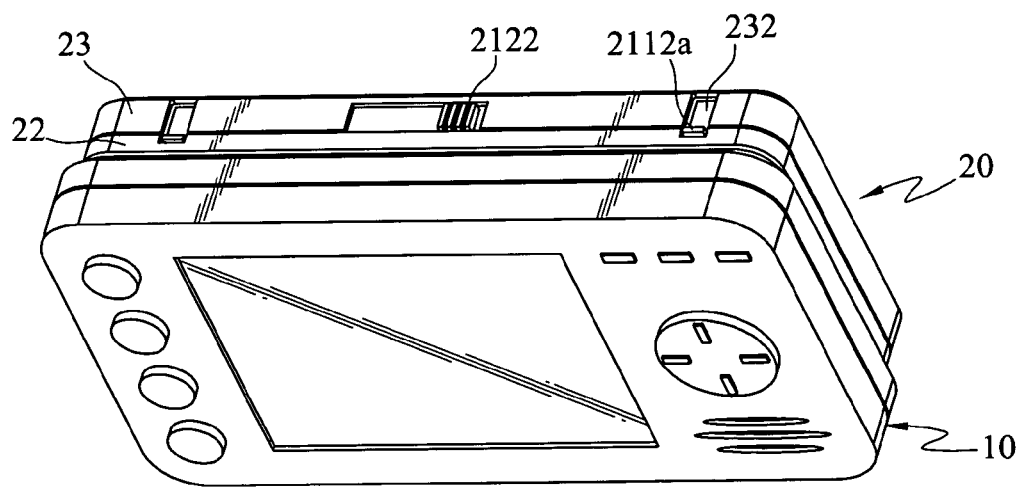

At the coupled position, the housing trough 2111 and the claw 2112 are extended respectively through the second opening 221 and the second trough 222. Refer to FIG. 2A for the schematic view of the first embodiment with the housing trough and the claw in the coupled position. When the board 13 opens the first trough 122, and the second anchor member 133 is coupled with the first anchor member 124, the claw 2112 can clamp the first trough 122, the second connector 25 in the housing trough 2111 can form an electric connection with the first connector 11 of the handheld electronic device 10, and the handheld electronic device 10 may be coupled with the back cartridge 20. Refer to FIGS. 3A and 3B for a first embodiment of the invention with the handheld electronic device 10 and the back cartridge 20 in coupled and separated conditions. The guided strut 2113 is located at the coupled end 2121a of the guiding flute 2121. As the expansion device 24 in the back cartridge 20 has already been coupled with the second connector 25, it also forms an electric connection with the first connector 11 in the handheld electronic device 10.

At the coupled position, the housing trough 2111 and the claw 2112 are held respectively in the second opening 221 and the second trough 222, and close the second opening 221 and the second trough 222. Refer to FIG. 2C for the schematic view of the first embodiment with the housing trough and the claw in the stored position. The handheld electronic device 10 and the back cartridge 20 may also be not coupled together. For this purpose, the guided strut 2113 is located at the stored end 2121b of the guiding flute 2121. And the expansion device 24 in the back cartridge 20 does not form an electric connection with the handheld electronic device 10.

To separate the handheld electronic device 10 and the back cartridge 20, and change the housing trough 2111 and the claw 2112 from the coupled position to the stored position, apply force to the anti-slipping traces 2122 on the push section 212 exposed to the first notch 231. The guiding flute 2121 then guides the guided strut 2113 from the coupled end 2121a to the stored end 2121b, and drives the clipping section 211 to move the housing trough 2111 and the claw 2112 from the coupled position to the stored position. Of course, exerting force on the exertion end 2112a of the claw 2112 exposed to the second notch 232 also can cause the guiding flute 2121 to direct the guided strut 2113 from the coupled end 2121a to the stored end 2121b, and drive the clipping section 211 to move the housing trough 2111 and the claw 2112 from the coupled position to the stored position.

On the other hand, to change the housing trough 2111 and the claw 2112 from the stored position to the coupled position to couple the handheld electronic device 10 with the back cartridge 20, apply force to the anti-slipping traces 2122 of the push section 212 exposed to the first notch 231. The guiding flute 2121 then guides the guided strut 2113 from the stored end 2121b to the coupled end 2121a, and drives the clipping section 211 to move the housing trough 2111 and the claw 2112 from the stored position to the coupled position. Of course, exerting force on the exertion end 2112a of the claw 2112 exposed to the second notch 232 can also cause the guiding flute 2121 to direct the guided strut 2113 from the stored end 2121b to the coupled end 2121a, and drive the clipping section 211 and move the housing trough 2111 and the claw 2112 from the stored position to the coupled position.

Thus through the anti-slipping traces 2122 or the exertion end 2112a of the push section 212, the housing trough 2111 and the claw 2112 may be moved to the stored position and the coupled position. At the coupled position, the claw 2112 clamps the first trough 122 of the handheld electronic device 10 (with the board 13 opening the first trough 122) to enable the handheld electronic device 10 to couple with the back cartridge 20. At the stored position, the handheld electronic device 10 and the back cartridge 20 are separated and still maintain an integrated and self-contained profile.

Figure 4:
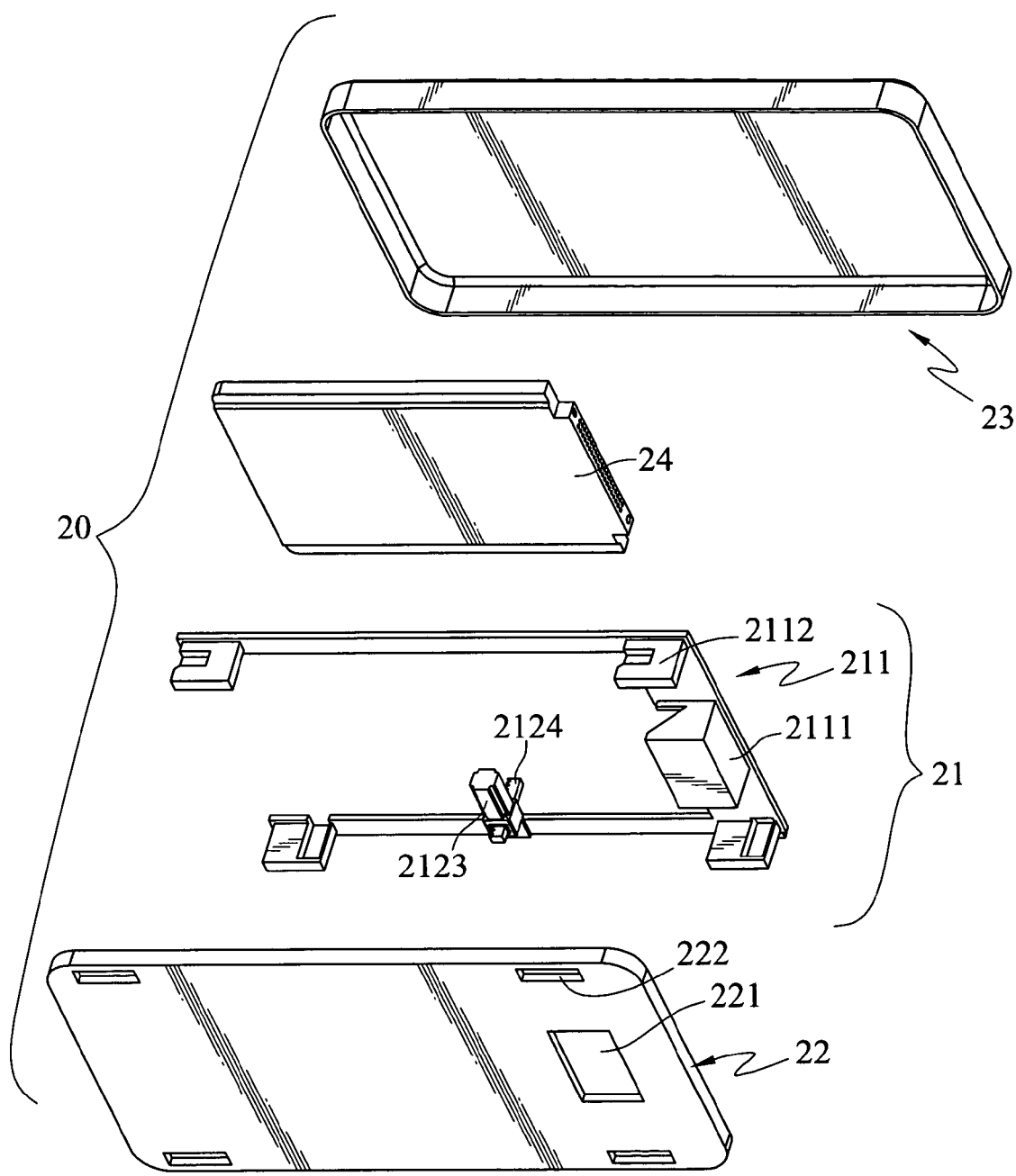
FIG. 4 is an exploded view of a second embodiment of the invention.
Figure 5:
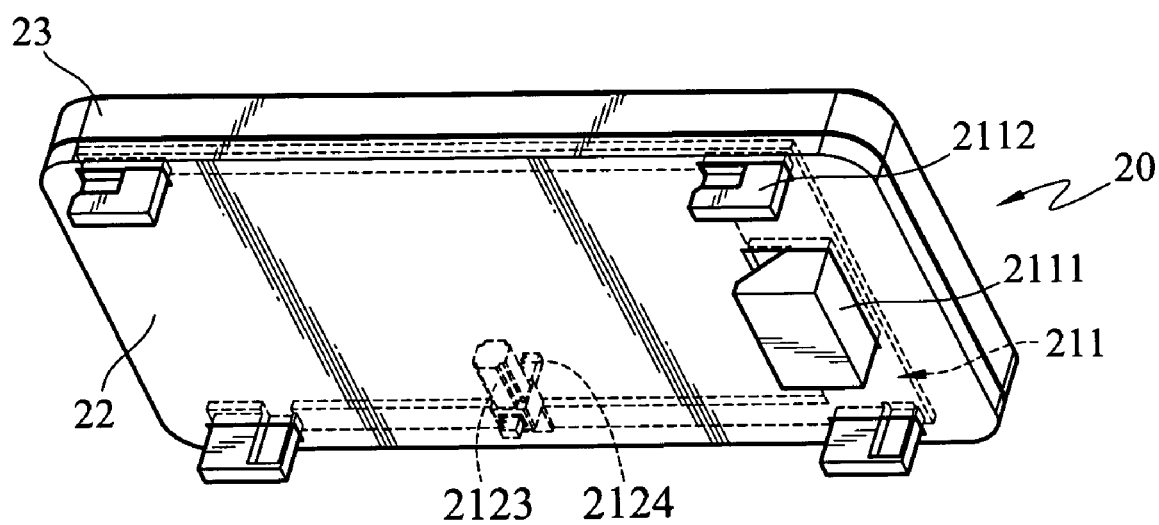
FIG. 5 is a schematic view of the second embodiment with the housing trough and the claw in a coupled position.

Of course the first embodiment set forth above may be altered, and a second embodiment shown in FIGS. 4 and 5 illustrates such an alteration. In the second embodiment, the handheld electronic device 10 remains the same, but the first notch 231 and the second notch 232 on the lower case 23 are dispensed with. The exertion end 2112a, push section 212 and guided strut 2113 of the second coupling assembly 21 are also omitted. The second coupling assembly 21 includes a clipping section 211 and another type of push section 212. The clipping section 211 has a housing trough 2111 and a claw 2122. The push section 212 has a linear motor 2123 coupled with the clipping section 211, and a gear rack 2124 engaged with the linear motor 2123, so that the linear motor 2123 can move on the gear rack 2112 to drive the clipping section 211 to the coupled position and the stored position to move the housing trough 2111 and the claw 2112 to the coupled position and the stored position.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A coupling structure for a handheld electronic device and a back cartridge thereof, comprising:
    a first coupling assembly, which is located on the handheld electronic device, has a first opening and a first trough, and the first opening corresponding to a first connector which is located in the handheld electronic device; and
    a second coupling assembly, which is located in the back cartridge, corresponds to the first coupling assembly, and includes a second opening, a second trough, a housing trough and a claw, whereby the second opening corresponds to the first opening and the housing trough, the second trough corresponds to the first trough, the housing trough contains a second connector of the back cartridge that connects electrically to an expansion device located in the back cartridge, the claw corresponds to the second trough, and the housing trough and the claw have a coupled position and a stored position;
    whereby at the coupled position, the housing trough and the claw are extended respectively through the second opening and the second trough to allow the claw to clamp the first trough, and make the first connector to connect electrically to the second connector, and allow the handheld electronic device to couple with the back cartridge, whereby at the stored position, the housing trough and the claw are held respectively in the second opening and the second trough to close the second opening and the second trough, and allow the handheld electronic device to be separated from the back cartridge.

2. The coupling structure of claim 1, wherein the second coupling assembly further includes:
    a clipping section containing the housing trough and the claw and a guided strut; and
    a push section including a guiding flute corresponding to the guided strut, the guiding flute having two ends forming respectively a coupled end and a stored end corresponding respectively to the coupled position and the stored position;
    whereby when a force is applied to the push section, the guided strut is directed, by the guiding flute, to the coupled end and the stored end, and the guided strut drives the clipping section, so that the housing trough and the claw are moved to the coupled position and the stored position.

3. The coupling structure of claim 2, wherein push section has an anti-slipping trace.

4. The coupling structure of claim 3, wherein the back cartridge has a case which consists of an upper case and a lower case mating with each other, the lower case having a first notch corresponding to the push section.

5. The coupling structure of claim 4, wherein the claw has an exertion end, the lower case having a second notch corresponding to the exertion end.

6. The coupling structure of claim 4, wherein the second opening and the second trough are formed on the upper case.

7. The coupling structure of claim 1, wherein the second coupling assembly further includes:
    a clipping section containing the housing trough and the claw; and
    a push section including a linear motor coupled with the clipping section and a gear rack engaged with the linear motor, so that the linear motor is movable on the gear rack to drive the clipping section to the coupled position and the stored position to move the housing trough and the claw to the coupled position and the stored position.

8. The coupling structure of claim 7, wherein the back cartridge has a case which consists of an upper case and a lower case mating with each other.

9. The coupling structure of claim 8, wherein the second opening and the second trough are formed on the upper case.

10. The coupling structure of claim 1 further including a board movably located on the handheld electronic device to close the first trough and the first opening, and a first anchor member located on the handheld electronic device.

11. The coupling structure of claim 10, wherein the board includes a second hole, an exertion section, a second anchor member, and a third hole, among which the second hole corresponds to the first trough, the exertion section corresponds to the first opening, the second anchor member corresponds to the first anchor member, the third hole corresponds to the first opening, and the board is movable to couple the second anchor member with the first anchor member to form an anchor condition and close the first trough and the first hole.

12. The coupling structure of claim 10, wherein the first anchor member is a cavity and the second anchor member is a bulged spot.

* * * * *